(12) United States Patent
Kube et al.

(10) Patent No.: US 9,994,262 B1
(45) Date of Patent: Jun. 12, 2018

(54) VEHICLE CARGO BED SYSTEM

(71) Applicant: FORD GLOBAL TECHNOLOGIES, LLC, Dearborn, MI (US)

(72) Inventors: Larry Kube, Brighton, MI (US); Kimberly Ann Lazarz, Ypsilanti, MI (US); Daniel Joseph McCarthy, Northville, MI (US); Vincent Anthony Chimento, Plymouth, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 0 days. days.

(21) Appl. No.: 15/409,987

(22) Filed: Jan. 19, 2017

(51) Int. Cl.
- *B62D 33/02* (2006.01)
- *B62D 33/027* (2006.01)
- *B62D 29/00* (2006.01)
- *B62D 21/02* (2006.01)

(52) U.S. Cl.
CPC ......... *B62D 33/0273* (2013.01); *B62D 21/02* (2013.01); *B62D 29/007* (2013.01); *B62D 29/008* (2013.01); *B62D 33/02* (2013.01)

(58) Field of Classification Search
CPC .... B62D 21/02; B62D 25/2054; B62D 33/02; B62D 33/023; B62D 33/0273; B62D 29/007; B62D 29/008
USPC ....................... 296/35.1, 182.1, 183.1, 184.1
See application file for complete search history.

(56) References Cited

U.S. PATENT DOCUMENTS

| | | | |
|---|---|---|---|
| 5,655,792 A * | 8/1997 | Booher | B23K 20/16 220/1.5 |
| 6,308,544 B1 | 10/2001 | Kuehnl et al. | |
| 6,673,469 B2 | 1/2004 | Isaccsson et al. | |
| 7,264,305 B2 * | 9/2007 | Kuriakose | B62D 25/2054 296/193.07 |
| 7,517,005 B2 | 4/2009 | Kuriakose | |
| 2005/0246865 A1 * | 11/2005 | Kim | B62D 33/0273 16/367 |
| 2011/0031776 A1 * | 2/2011 | Edwards | B62D 25/2054 296/97.23 |
| 2013/0168989 A1 * | 7/2013 | Sasage | B62D 24/02 296/35.1 |
| 2014/0345091 A1 * | 11/2014 | Pierce | F16B 2/20 24/326 |
| 2015/0353144 A1 * | 12/2015 | Faruque | B62D 25/00 403/345 |
| 2015/0375808 A1 * | 12/2015 | Ganti | B62D 33/077 296/35.1 |
| 2016/0016522 A1 * | 1/2016 | Smith | F16B 37/043 296/35.1 |
| 2017/0101141 A1 * | 4/2017 | Booher | B62D 53/061 |
| 2017/0233016 A1 * | 8/2017 | Courtright | B62D 33/077 296/183.1 |

* cited by examiner

*Primary Examiner* — Gregory A Blankenship
(74) *Attorney, Agent, or Firm* — Jason Rogers; Brooks Kushman P.C.

(57) ABSTRACT

A vehicle includes a steel frame, steel bracket, an e-coating layer, and an aluminum cargo bed. The steel frame has a top side. The steel bracket has a zinc-plating, is secured to the top side of the steel frame, and has an upper surface that faces away from the frame. The e-coating layer is deposited externally and collectively on the steel frame and steel bracket. The aluminum cargo bed is secured to the upper surface such that the zinc-plating and e-coating layer are sandwiched between the steel bracket and aluminum cargo bed.

20 Claims, 2 Drawing Sheets

VEHICLE CARGO BED SYSTEM

TECHNICAL FIELD

The present disclosure relates to body and frame structures for automobiles.

BACKGROUND

Automobiles, including trucks, may have cargo beds that are configured to secure and store cargo shipments.

SUMMARY

A vehicle includes a steel frame, steel bracket, e-coating layer, and aluminum cargo bed. The steel frame has a top side. The steel bracket has a zinc-plating, is secured to the top side of the steel frame, and has an upper surface that faces away from the frame. The e-coating layer is deposited externally and collectively on the steel frame and steel bracket. The aluminum cargo bed is secured to the upper surface such that the zinc-plating and e-coating layer are sandwiched between the steel bracket and aluminum cargo bed.

A vehicle frame includes a steel rail, cargo bed mounting plate, and e-coating layer. The steel rail has a top side and extends longitudinally. The cargo bed mounting plate has a zinc-plating, is secured to the top side, and has an upper surface facing away from the rail. The e-coating layer is deposited externally and collectively on the rail and bracket such that the e-coating layer is deposited over the zinc-plating.

A vehicle includes a metallic frame, metallic bracket, e-coating layer, and cargo bed. The metallic frame has a top side. The metallic bracket has a zinc-plating, is secured to the top side, and has an upper surface that faces away from the frame. The e-coating layer is deposited externally and collectively on the metallic frame and metallic bracket. The cargo bed is comprised of a dissimilar metal with respect to the metallic frame and metallic bracket. The bed is secured to the upper surface of the metallic bracket and sandwiches the zinc-plating and e-coating layer between the metallic bracket and cargo bed.

DETAILED DESCRIPTION

Embodiments of the present disclosure are described herein. It is to be understood, however, that the disclosed embodiments are merely examples and other embodiments may take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures may be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
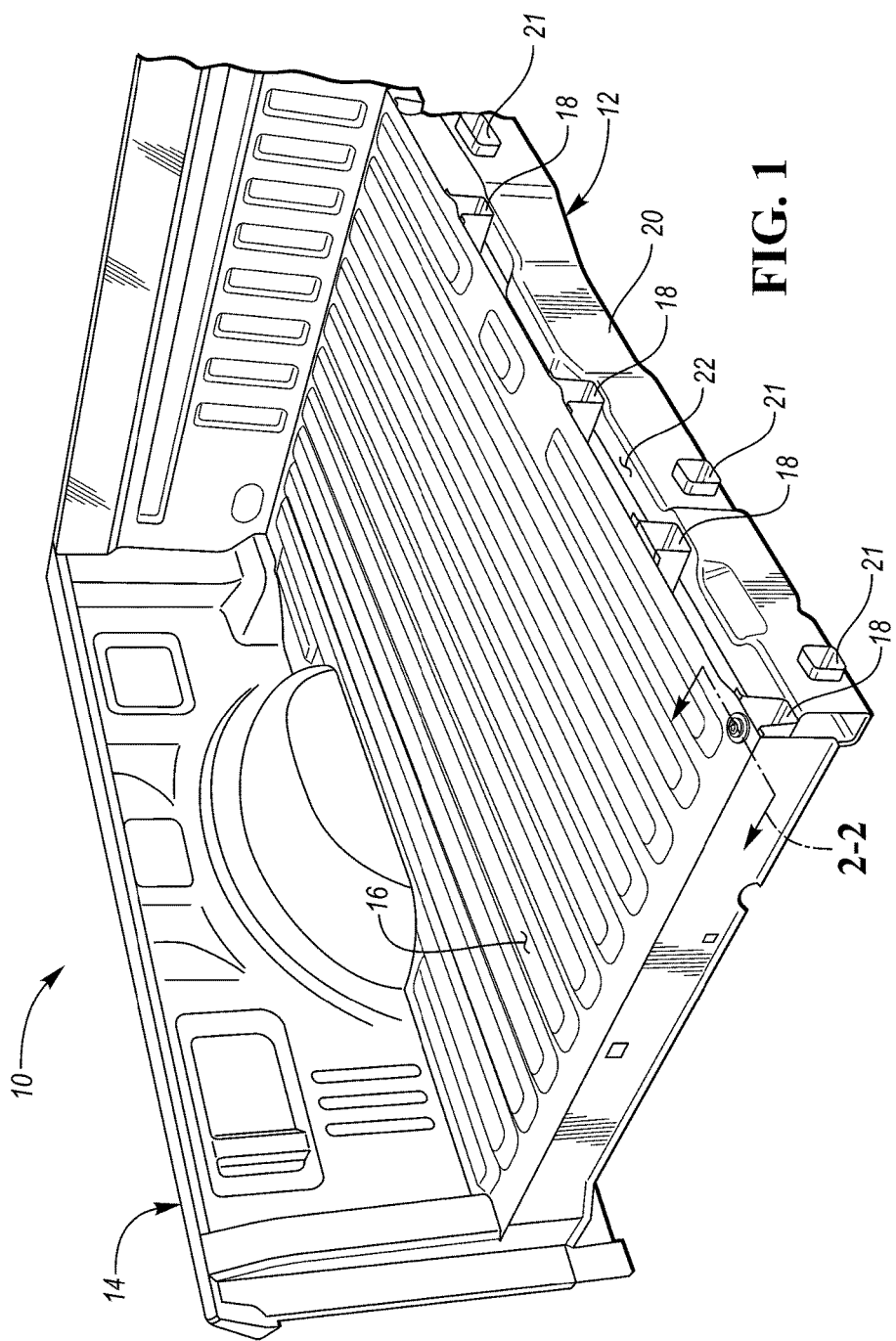
FIG. 1 is a perspective rear view of a truck including a partial cutaway view of a cargo bed.

Referring to FIG. 1, a vehicle (or truck) 10 having a frame 12 and a cargo bed (or truck bed) 14 is illustrated. The cargo bed 14 may include a tailgate which has been removed for illustrative purposes in FIG. 1. The cargo bed 14 may include a floor panel 16 and at least one crossbeam 18 secured to and protruding from a bottom surface of the floor panel. The crossbeam 18 may be connected to the floor panel by a welding process or by fasteners, such as rivets, screws, bolts, or any other type of faster known to a person of ordinary skill in the art. The frame 12 may include rails 20 that extend longitudinally from a rear toward a front of the vehicle 10. A first rail 20 (which is visible along the cutaway portion of FIG. 1) may be substantially parallel with a second rail 20 (which is located below the floor panel and not visible in FIG. 1). The frame 12 may include a plurality of cross-members 21 that extend between each of the rails 20. The cross-members 21 of the frame 12 may be connected to each of the rails 20 in order to secure the rails 20 to each other. The cross-members 21 may be connected to the rails 20 by a welding process or by fasteners, such as rivets, screws, bolts, or any other type of faster known to a person of ordinary skill in the art. The cargo bed 14 may be secured to a top side of the frame 12. More specifically, a bottom surface of each of the crossbeams 18 may be secured to top sides 22 of each of the rails 20. The mounting interfaces between the cargo bed 14 and the frame 12 may further include plates or brackets (described in further detail below) that are disposed between and secured to both the cargo bed 14 and the frame 12. More specifically, the plates or brackets at the mounting interfaces may be disposed between and secured to both the bottom surfaces of the crossbeam 18 and the top sides 22 of the rails 20.

The frame 12 (including the rails 20 and cross-members 21) may be comprised of a first metallic material while the cargo bed 14 (including the floor panel 16 and crossbeams 18) may be made be comprised of a second metallic material. The first and second metallic material may be dissimilar metals. The plates or brackets at the mounting interfaces between cargo bed 14 and frame 12 may be comprised of a similar metal with respect to the frame 12. The frame 12 (including the rails 20 and cross-members 21) and the plates or brackets at the mounting interfaces between cargo bed 14 and frame 12 may be comprised of steel. The cargo bed 14 (including the floor panel 16 and crossbeams 18) may be comprised of aluminum or an alloy thereof. Alternatively, the cargo bed 14 (including the floor panel 16 and crossbeams 18) may be comprised of magnesium or an alloy thereof.

Figure 2:
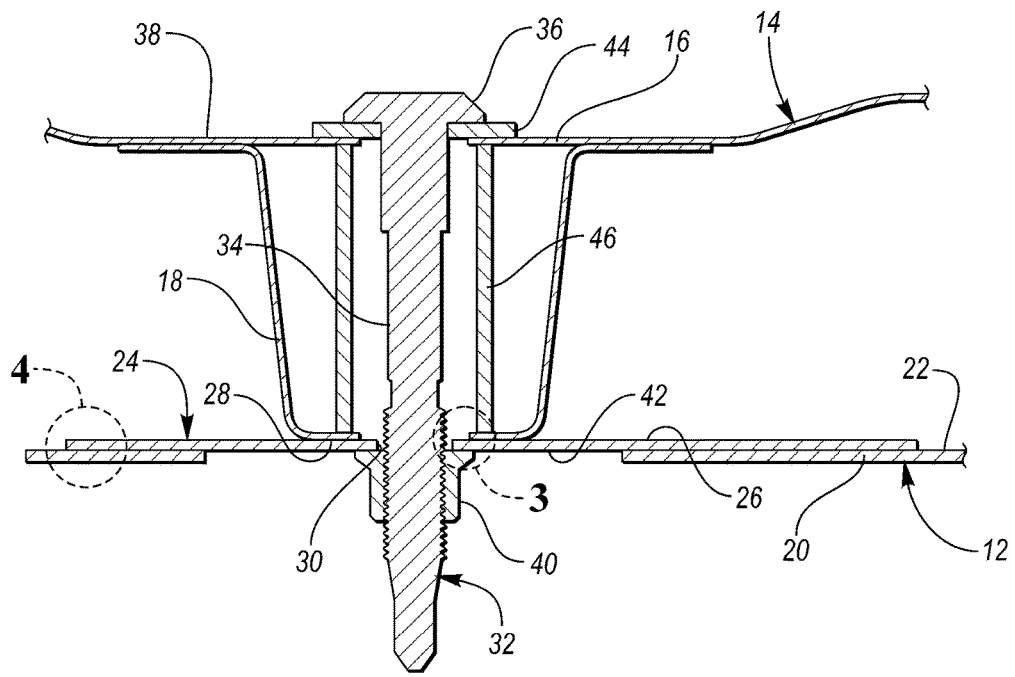
FIG. 2 is a cross-sectional view taken along line 2-2 in FIG. 1.

Referring to FIG. 2 is a cross-sectional view taken along line 2-2 in FIG. 1 is illustrated. FIG. 2 illustrates one of a plurality of mounting interfaces between the cargo bed 14 and the frame 12. There may be at least four mounting interfaces between the cargo bed 14 and the frame 12 where one of each of the mounting interfaces is located proximate to each corner of the cargo bed 14. The mounting interface includes a bracket 24 that is secured to the top side of the frame 12. More specifically, the bracket 24 may be secured to the top side 22 of the rail 20. The bracket 24 may be secured to the frame 12 by a welding process or by fasteners, such as rivets, screws, bolts, or any other type of faster known to a person of ordinary skill in the art. The bracket 24 may have an upper surface 26 that faces away from the frame 12.

The cargo bed 14 may be secured to the upper surface 26 of the bracket 24. More specifically, a bottom surface 28 of crossbeam 18 may be secured to the upper surface 26 of the bracket 24. The bracket 24 may include an internal peripheral surface 30 that defines and encompasses an orifice. The cargo bed 14 may be secured to the frame 12 (or rail 20) by a fastener 32 that extends through the orifice defined by the internal peripheral surface 30. More specifically, the fastener 32 may extend through an orifice defined by floor panel 16, an orifice defined by the crossbeam 18, and the orifice defined by the internal peripheral surface 30 of the bracket 24 in order to secure the cargo bed 14 to the frame 12 (or rail 20). The fastener 32 may be a steel bolt that includes a threaded portion 34 that extends from a head 36. The head 36 may engage a top surface 38 of the floor panel 16. The threaded portion 34 may extend through the crossbeam 18 (via the orifices defined by floor panel 16 and the crossbeam 18), through the orifice defined by the internal peripheral surface 30 of the bracket 24, and may engage a nut 40 that is secured to or engages a lower surface 42 of the bracket 24. A washer 44 may be disposed between the head 36 of the fastener 32 and the floor panel 16. More specifically, the washer 44 may be disposed between the head 36 and the top surface 38 of the floor panel 16. The crossbeam 18 may define a void between the floor panel 16 and the bottom surface 28 of the crossbeam 18. In order to increase the structural integrity of the mounting interface, a cylindrical insert 46 may be disposed within the void between the floor panel 16 and the bottom surface 28 of the crossbeam 18. The threaded portion 34 of the fastener 32 may also extend through an orifice defined by the cylindrical insert 46. The cylindrical insert 46 may be comprised of a similar metallic material with respect to the cargo bed 14 (including the floor panel 16 in crossbeam 18).

Specific components may be treated or coated in order to reduce galvanic corrosion that may occur between components that are both connected to each other and made from dissimilar metals. For example, since the components of the cargo bed 14 (i.e., the floor panel 16 and the crossbeams 18) may be made from a first metal (e.g., aluminum, magnesium, or any alloy thereof) while the components of the frame 12 (i.e., the rails 20 and the cross-members 21) may be made from a second dissimilar metal (e.g., steel), it may be important to treat or coat some or all of the components that comprise the mounting interface between the cargo bed 14 and the frame 12.

Figure 3:
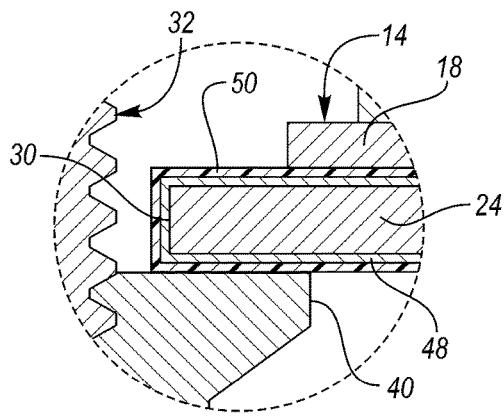
FIG. 3 is an enlarged view of the area encompassed by the boundary 3-3 in FIG. 2.
Figure 4:
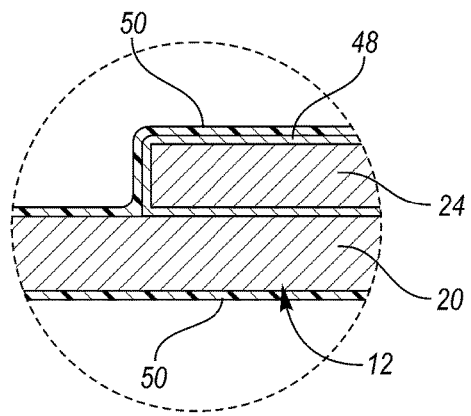
FIG. 4 is an enlarged view of the area encompassed by the boundary 4-4 in FIG. 2

Referring to FIGS. 3 and 4, enlarged views of the areas in FIG. 2 encompassed by the boundaries 3-3 and 4-4, respectively, are illustrated. FIGS. 3 and 4 illustrate the treatments and/or coatings that are applied to the respective components that comprise the mounting interface between the cargo bed 14 and the frame 12 in order to reduce galvanic corrosion. First, the bracket 24 may be treated such that the external surfaces are covered with a zinc-plating 48. Second, an e-coating layer 50 may be deposited collectively on the external surfaces of the bracket 24 (over the zinc-plating 48) and the frame 12. More specifically, the e-coating layer 50 may be deposited collectively on the external surfaces of the bracket 24 (over the zinc-plating 48) and the rails 20 of frame 12. The zinc-plating 48 and the e-coating layer 50 may be sandwiched between the bracket 24 and the cargo bed 14. More specifically, the zinc-plating 48 and the e-coating layer 50 may be sandwiched between the bracket 24 and the crossbeam 18 of the cargo bed 14. The internal peripheral surface 30 of the bracket 24 that defines an orifice may also be covered first by the zinc-plating 48 and second by the e-coating layer 50. The washer 44 may be made from steel that is also zinc-plating and/or covered by an e-coating layer (that may be deposited over the zinc-plating).

E-coating may refer to electrophoretic deposition (EPD), which is a term that includes a broad range of industrial processes which includes electrocoating, cathodic electrodeposition, anodic electrodeposition, and electrophoretic coating, or electrophoretic painting. The process includes depositing materials (i.e., the e-coating layer) onto a surface that is functioning as an electrode. The materials that may be deposited onto a surface during an e-coating process to form the e-coat may be polymers, pigments, dyes, ceramics, metals, or any combination thereof.

The words used in the specification are words of description rather than limitation, and it is understood that various changes may be made without departing from the spirit and scope of the disclosure. As previously described, the features of various embodiments may be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics may be compromised to achieve desired overall system attributes, which depend on the specific application and implementation. As such, embodiments described as less desirable than other embodiments or prior art implementations with respect to one or more characteristics are not outside the scope of the disclosure and may be desirable for particular applications.

What is claimed is:

1. A vehicle comprising:
   a steel frame having a top side;
   a steel bracket having a zinc-plating, secured to the top side, and having an upper surface facing away from the frame;
   an e-coating layer deposited externally and collectively on the frame and bracket; and
   an aluminum cargo bed secured to the upper surface such that the zinc-plating and e-coating layer are sandwiched between the bracket and bed.

2. The vehicle of claim 1, wherein an internal peripheral surface of the bracket defines and encompasses an orifice, the internal peripheral surface being zinc-plated and covered by the e-coating layer, and the bed is secured to the frame by a fastener extending through the orifice.

3. The vehicle of claim 2, wherein the bed includes an aluminum crossbeam and an aluminum floor panel, the crossbeam protrudes from a bottom side of the floor panel, and a bottom surface of the crossbeam is secured to the upper surface of the bracket.

4. The vehicle of claim 3, wherein the fastener is a steel bolt that includes a threaded portion extending from a head, the head engages a top surface of the floor panel, and the threaded portion extends through the crossbeam, through the orifice, and engages a nut that is secured to a lower surface of the bracket.

5. The vehicle of claim 4, wherein a zinc-plated washer is disposed between the head and the floor panel.

6. The vehicle of claim 5, wherein a second e-coating layer is deposited externally on the washer.

7. A vehicle frame comprising:
a steel rail having a top side and extending longitudinally;
a cargo bed mounting plate having a zinc-plating, secured to the top side, and having an upper surface facing away from the rail; and
an e-coating layer deposited externally and collectively on the rail and cargo bed mounting plate such that the e-coating layer is deposited over the zinc-plating.

8. The frame of claim 7, wherein an internal peripheral surface of the cargo bed mounting plate defines and encompasses an orifice configured to receive a fastener, the internal peripheral surface being zinc-plated and covered by the e-coating layer.

9. A vehicle comprising:
a metallic frame having a top side;
a metallic bracket having a zinc-plating, secured to the top side, and having an upper surface facing away from the frame;
an e-coating layer deposited externally and collectively on the frame and bracket; and
a cargo bed comprised of a dissimilar metal with respect to the frame and bracket, the bed secured to the upper surface sandwiching the zinc-plating and e-coating layer between the bracket and bed.

10. The vehicle of claim 9, wherein an internal peripheral surface of the bracket defines and encompasses an orifice, the internal peripheral surface being zinc-plated and covered by the e-coating layer, and the bed is secured to the frame by a fastener extending through the orifice.

11. The vehicle of claim 10, wherein the bed includes a crossbeam and a floor panel, the crossbeam protrudes from a bottom side of the floor panel, and a bottom surface of the crossbeam is secured to the upper surface of the bracket.

12. The vehicle of claim 11, wherein the crossbeam is comprised of aluminum and the bracket is comprised of zinc-plated steel.

13. The vehicle of claim 11, wherein the fastener is a bolt that includes a threaded portion extending from a head, the head engages a top surface of the floor panel, and the threaded portion extends through the crossbeam, through the orifice, and engages a nut that is secured to a lower surface of the bracket.

14. The vehicle of claim 13, wherein the crossbeam and floor panel are comprised of aluminum, the bracket is comprised of zinc-plated steel, and the fastener is comprised of steel.

15. The vehicle of claim 13, wherein the crossbeam and floor panel are comprised of magnesium, the bracket is comprised of zinc-plated steel, and the fastener is comprised of steel.

16. The vehicle of claim 13, wherein a zinc-plated washer is disposed between the head and the floor panel.

17. The vehicle of claim 16, wherein the zinc-plated washer is comprised of steel.

18. The vehicle of claim 16, wherein a second e-coating layer is deposited externally on the washer.

19. The vehicle of claim 9, wherein the frame is comprised of steel, the bracket is comprised of zinc-plated steel, and the bed is comprised of aluminum.

20. The vehicle of claim 9, wherein the frame is comprised of steel, the bracket is comprised of zinc-plated steel, and the bed is comprised of magnesium.

* * * * *